No. 772,324. PATENTED OCT. 11, 1904.
N. D. ASDELL.
ROOT EXTRACTING FORCEPS.
APPLICATION FILED FEB. 19, 1904.
NO MODEL.
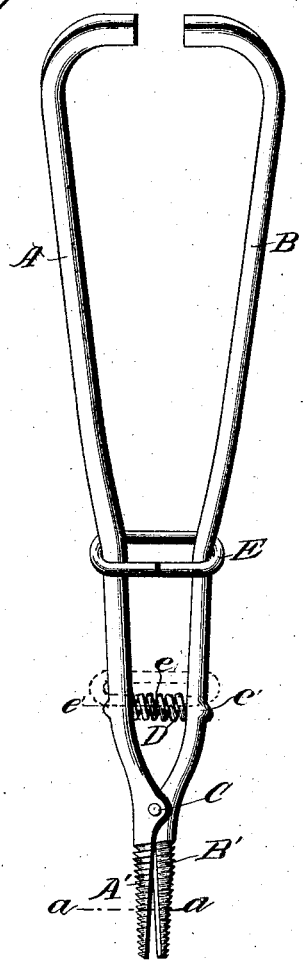
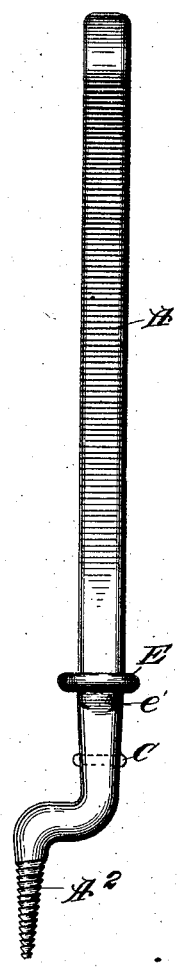
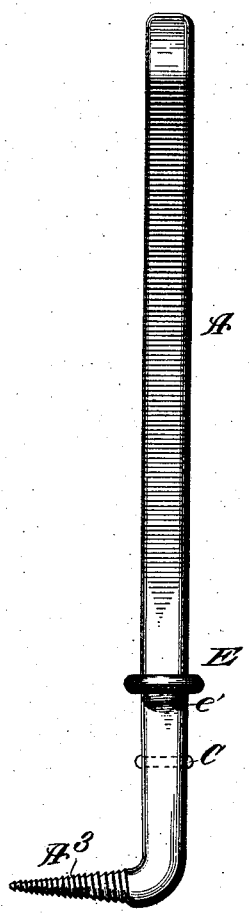
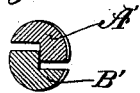
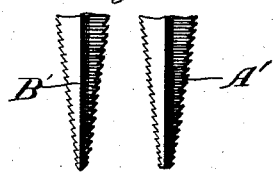
WITNESSES:
INVENTOR
Nelson D. Asdell
BY
ATTORNEYS No. 772,324.

Patented October 11, 1904.

UNITED STATES PATENT OFFICE.

NELSON DEAN ASDELL, OF SAN FRANCISCO, CALIFORNIA.

ROOT-EXTRACTING FORCEPS.

SPECIFICATION forming part of Letters Patent No. 772,324, dated October 11, 1904.

Application filed February 19, 1904. Serial No. 194,425. (No model.)

*To all whom it may concern:*

Be it known that I, NELSON DEAN ASDELL, a citizen of the United States, residing at San Francisco, in the county of San Francisco and State of California, have invented a new and useful Improvement in Root-Extracting Forceps, of which the following is a specification.

My invention is in the nature of an improvement in dental forceps designed especially for extracting the roots of teeth which from the absence of a crown or body portion are difficult to extract without more or less mutilation to the gum and pain to the patient. It is an improvement upon that form of root-extractor in which the forceps are formed with a tapering and externally-screw-threaded beak made in two halves which are turned into the cavity of the root and then expanded to tightly engage and firmly hold the root, so as to extract it by an internal anchorage instead of gripping the root externally.

My improvement consists in forming the adjacent faces of the screw-threaded and longitudinally-divided beak with a longitudinal or intermeshing rabbet, so that the two sections of the tapering and screw-threaded sections will not slip or twist upon each other when rotated about a longitudinal axis, but will, on the other hand, mutually brace each other and hold together, so that the beak may be tightly seated in the root-cavity.

It also consists in means for maintaining the tight grip of the two halves of the beak while extracting the root, as will be hereinafter fully described with reference to the drawings.

Figure 1 is a side view of my improved root-extracting forceps. Fig. 1ª is an enlarged cross-section on line *a a* of Fig. 1. Fig. 1ᵇ is an inside view of the two adjacent faces of the interlocking beak-sections. Figs. 2 and 3 are side views of modified shapes of the beak.

In the drawings, A and B represent the two forcep-handles, which are formed as levers pivoted together at C.

D is the spring for forcing the levers apart. This spring may be a spiral spring wound about a pin *e*, extending through the levers, or it may be the usual flat spring.

A' B' are the two halves of the beak, which halves are formed as jaws on the ends of the two handle-levers A and B and when forced together by the spring D constitute a tapering beak whose extreme end is small enough to be entered into the reamed-out cavity of the root and to penetrate the same for a distance sufficient to get a firm anchorage in the same. The exterior surface of the beak is cut with a right-hand screw-thread, and the sides of these threads are so formed as to give the firmest hold against an upward pull and for this purpose have a pitch like saw-teeth, the upper faces of the threads being at right angles to the longitudinal axis of the beak, while the lower faces of the threads are inclined, as seen in Fig. 1ᵇ. The adjacent faces of the two sections of the beak are made with a reverse rabbet, as seen in Figs. 1ª and 1ᵇ, so that they will interlock. This is an important feature of my improvement for the following reasons: When the faces are made flat and plain, the act of screwing the tapering beak into the root-cavity allows the two sections from the rotary strain to twist and slip the one upon the other; but when the two sections of the beak are interlocked by the rabbet they mutually brace and sustain each other in resisting this tendency to twist and slip even when the jaws of the beak are slightly pressed apart by a compression of the handles A and B in getting a firmer adhesion of the jaws of the beak to the root.

E is a sliding link or yoke which embraces and is retained adjustably upon the levers A and B and is prevented from slipping down over the beak by projections *e'* on the handles. The purpose of this sliding link is to maintain the tight expanding grip of the beak-jaws during the extraction, and it is operated as follows:

When the forceps is to be used, the root-cavity is first drilled or reamed out sufficiently to remove the soft decay and give a hard socket-wall to the root-cavity. The beak, whose sections are normally closed and held closed by the spring D, is then turned into the cavity. Up to this time the link E has been resting against the projections *e'*, as shown by dotted lines in Fig. 1. The beak in closed conditions having been entered into the root-cavity, the handles A and B are slightly compressed and the link E is drawn from the dotted position to the full-line position, which has a tendency to hold the jaws A' B' slightly opened and tightly engaged by an outward thrust against the interior walls of the root-cavity. A sufficient power may now be applied to the handle-levers to extract the root without danger of disconnecting the hold, making the extraction of the root easy and avoiding all mutilation of the gum.

In Fig. 1 the beak is shown to be straight and extending in the longitudinal axis of the handles. As a modification I may make the forceps as shown in Fig. 2, in which the beak is parallel to the longitudinal axis of the handle, but is offset from the same, or the beak may occupy a position at right angles to the handles, as shown in Fig. 3. These various forms will supply the various requirements of differently-situated roots and give a full range of application for the invention.

Having thus described my invention, what I claim as new, and desire to secure by Letters Patent, is—

1. A root-extracting forceps having a tapering and externally-serrated beak made in two longitudinal sections having interlocking surfaces on their adjacent faces to resist twisting of the sections under a torsional strain substantially as described.

2. A root-extracting forceps having a tapering and externally-serrated beak made in two longitudinal sections having interlocking surfaces, lever-handles connecting with said two beak-sections, a spring arranged between the lever-handles and a loosely-sliding link embracing the lever-handles and longitudinally adjustable thereon substantially as and for the purpose described.

3. A root-extracting forceps, comprising two lever-handles pivoted together and formed with tapering beak-sections serrated externally and having interlocking surfaces, a pin extending at right angles through the lever-handles, projections on the lever-handles, a spiral spring coiled upon said pin between the handles, and a sliding link embracing the handles and adapted to be stopped by the said projections substantially as described.

NELSON DEAN ASDELL.

Witnesses:
R. P. DEMINGS,
FRANK J. BURKE.